United States Patent

Park

[11] Patent Number: 5,912,957
[45] Date of Patent: Jun. 15, 1999

[54] TECHNIQUE FOR RECONNECTING OFFICE LINE TO KEY TELEPHONE SYSTEM AFTER POWER FAILURE

[75] Inventor: Moon-Kyeong Park, Gumi, Rep. of Korea

[73] Assignee: SamSung Electronics Co., Ltd., Suwon, Rep. of Korea

[21] Appl. No.: 08/746,174

[22] Filed: Nov. 7, 1996

[30] Foreign Application Priority Data

Nov. 8, 1995 [KR] Rep. of Korea ................ 95-40218

[51] Int. Cl.⁶ ............................................ H04M 1/00
[52] U.S. Cl. ............................ 379/165; 379/37; 379/156; 379/166; 379/322; 379/377
[58] Field of Search ................................. 379/165, 130, 379/164, 169, 176, 182, 186, 187, 1, 27, 32, 34, 37, 156, 157, 159, 166, 140, 141, 46, 42, 322, 377

[56] References Cited

U.S. PATENT DOCUMENTS

| | | |
|---|---|---|
| 4,100,375 | 7/1978 | Noller . |
| 4,392,024 | 7/1983 | Shinoi et al. . |
| 4,575,584 | 3/1986 | Smith et al. . |
| 4,972,452 | 11/1990 | Chack et al. ................................. 379/2 |
| 5,142,571 | 8/1992 | Suzuki et al. ............................ 379/279 |
| 5,200,990 | 4/1993 | Cho ........................................... 379/165 |
| 5,220,597 | 6/1993 | Horiuchi ................................... 379/362 |
| 5,483,574 | 1/1996 | Yuyama ..................................... 379/32 |
| 5,581,612 | 12/1996 | Nishikawa ............................... 379/156 |

*Primary Examiner*—Curtis A. Kuntz
*Assistant Examiner*—Binh K. Tieu
*Attorney, Agent, or Firm*—Robert E. Bushnell, Esq.

[57] ABSTRACT

A power failure shunting office line restoring circuit includes: a first relay having an office line tip port connected to a common port for connecting the tip port of the office line to a separate emergency telephone or a key telephone office line accommodating circuit in accordance with a first relay control signal; a second relay having an office line ring port connected to a common port for connecting the ring port of the office line to the emergency telephone or the key telephone office line accommodating circuit in accordance with a second relay control signal; a controller for generating the first and second relay control signals according to a power supply state or emergency telephone use state detection signal; first and second relay drivers for driving the first and second relays in accordance with the first and second relay control signals generated by the controller, and a detector connected to the first relay for detecting the use of the emergency telephone and for outputting the use state detection signal to the controller.

9 Claims, 4 Drawing Sheets

Fig. 4A
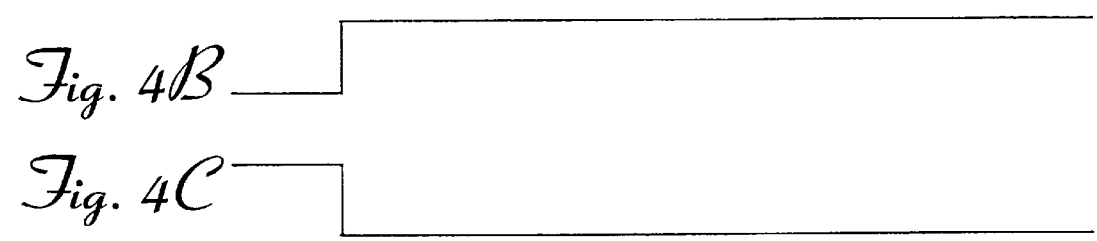
Fig. 4B
Fig. 4C

TECHNIQUE FOR RECONNECTING OFFICE LINE TO KEY TELEPHONE SYSTEM AFTER POWER FAILURE

CLAIM OF PRIORITY

This application claims all benefits accruing under 35 U.S.C. §119 from an application for SHUNTING OFFICE LINE RESTORING CIRCUIT AND METHOD DURING POWER FAILURE IN KEY PHONE SYSTEM earlier filed in the Korean Industrial Property Office on Nov. 8, 1995 and there duly assigned Ser. No. 40218/1995.

BACKGROUND OF THE INVENTION

1. Field of the Invention

The present invention relates to an office line restoring circuit and technique for a key telephone system, and more particularly, to a shunting office line restoring circuit and technique for restoring a telephone office line to a telephone line accommodating circuit of a key telephone system by detecting the use of an emergency telephone system when power is supplied after the power has been previously interrupted.

2. Description of the Related Art

Generally, a key telephone system cannot use an office line if power is not supplied. In other words, if the power is abruptly interrupted, a subscriber of the key telephone system cannot communicate at all. In order to solve the inconvenience, a circuit for partially switching telephone office lines to an emergency telephone system may be constructed, which is called a power failure shunting office line circuit. If power is not supplied to the key telephone system, the power failure shunting office line circuit connects the telephone office line to the emergency telephone system so that the office line may be used by the emergency telephone system. Then, if the power is restored, the power failure shunting office line circuit restores the telephone office line to a telephone office line accommodating circuit of the key telephone system.

In an earlier key telephone system, a single relay has a pair of common ports COM respectively connected to a tip port TIP and a ring port RING of an office line. If the power supply to the key telephone system is normal, a current flows through a coil of the relay so that the pair of common ports COM connected to the tip port TIP and ring port RING of the office line are connected to a pair of normally open ports which switches the office line to a key telephone office line accommodating circuit of the key telephone system.

However, if the power supply has failed, the current does not flow through the coil of the relay and accordingly, in the relay, the pair of common ports COM connected to the tip port TIP and ring port RING of the office line are connected to a pair of normally closed contact ports which switches the office line to an emergency telephone.

Therefore, the earlier power failure shunting office line circuits determines an office line switching simply depending on the condition of the power supply when the office line was again connected to the key telephone office line accommodating circuit. Thus, when the emergency telephone line is connected to the office line during a power failure the emergency telephone is automatically disconnected if power is abruptly restored, irrespective of the fact that user may be in the middle of the conversation using the emergency telephone.

All of the following references disclose telephone systems which essentially operate in the fashion noted above. That is, they make no provision for maintaining the connection between the office line and the emergency telephone subsequent to the power being restored after an earlier power failure: U.S. Pat. No. 5,483,574 to Yuyama, entitled COMMUNICATION TERMINAL EQUIPMENT, U.S. Pat. No. 5,200,990 to Cho, entitled METHOD OF RECOVERING SPEECH PATH OF PRE-ENGAGED CALL ON RESTARTING KEYPHONE EXCHANGE SYSTEM, U.S. Pat. No. 5,142,571 to Suzuki et al., entitled DIGITAL TELEPHONE SET HAVING AN EMERGENCY SWITCHING FUNCTION AND COMMUNICATION SYSTEM HAVING THE SAME, U.S. Pat. No. 4,972,452 to Chak et al., entitled DIGITAL BYPASS FOR TELEPHONE SYSTEM, U.S. Pat. No. 4,575,584 to Smith et al., entitled FAIL-SAFE DIGITAL PHONE, U.S. Pat. No. 4,392,024 to Shinoi et al., entitled ELECTRONIC KEY TELEPHONE SET CIRCUIT FOR PERMITTING DIALING DURING FAILURE OF COMMERCIAL POWER SUPPLIED TO THE SET, U.S. Pat. No. 4,100,375 to Noller, entitled TELEPHONE, INTERCOM AND REMOTE CONTROL SYSTEM, and U.S. Pat. No. 5,220,597 to Horiuchi, entitled DIALING APPARATUS FOR POWER FAILURE EXTENSION TELEPHONE SET OF KEY TELEPHONE SYSTEM.

SUMMARY OF THE INVENTION

Therefore, it is an object of the present invention to provide a power failure shunting office line restoring circuit and technique, which can connect an office line to a key telephone office line accommodating circuit depending on use by detecting the use of an emergency telephone when power is restored after a power failure has occurred in a key telephone system.

It is another object of the present invention to provide a power failure shunting office line restoring circuit and technique, which does not restore an office line to a key telephone office line accommodating circuit until the use of the emergency telephone has been completed if the emergency telephone is in use when the power is restored when a loss of the power to a key telephone system has previously occurred due to a power failure.

To accomplish the above object, there is provided a power failure shunting office line restoring circuit comprising: a first relay having a tip port of an office line connected to a common port thereof for connecting the tip port of the office line to either a separate emergency telephone or a key telephone office line accommodating circuit in a accordance with a first relay control signal; a second relay having a ring port of the office line connected to a common port for connecting the ring port of the office line to the emergency telephone or key telephone office line accommodating circuit in accordance with a second relay control signal, a controller for generating the first and second relay control signals according to a power supply or emergency telephone use state detection signal, first and second relay drivers for respectively driving the first and second relays in accordance with the first and second relay control signals generated by the controller, and a detector connected to the first relay for detecting the use of the emergency telephone and for outputting the use state detection signal to the controller.

According to another aspect of the present invention, a power failure shunting office line restoring technique which operates after a power failure in a key telephone system having a separate emergency telephone and a key telephone office line accommodating circuit, the method comprising the steps of: switching an office line to the emergency telephone when a power failure occurs; detecting the use of the emergency telephone when the power is restored to the key telephone system when the office line has been switched to the emergency telephone; and maintaining the connection of the office line to the emergency telephone when the emergency telephone is in use.

BRIEF DESCRIPTION OF THE DRAWINGS

FIGS. 4A–4C form an operational timing diagram according to the present invention.

DETAILED DESCRIPTION OF THE PREFERRED EMBODIMENT

Figure 1:
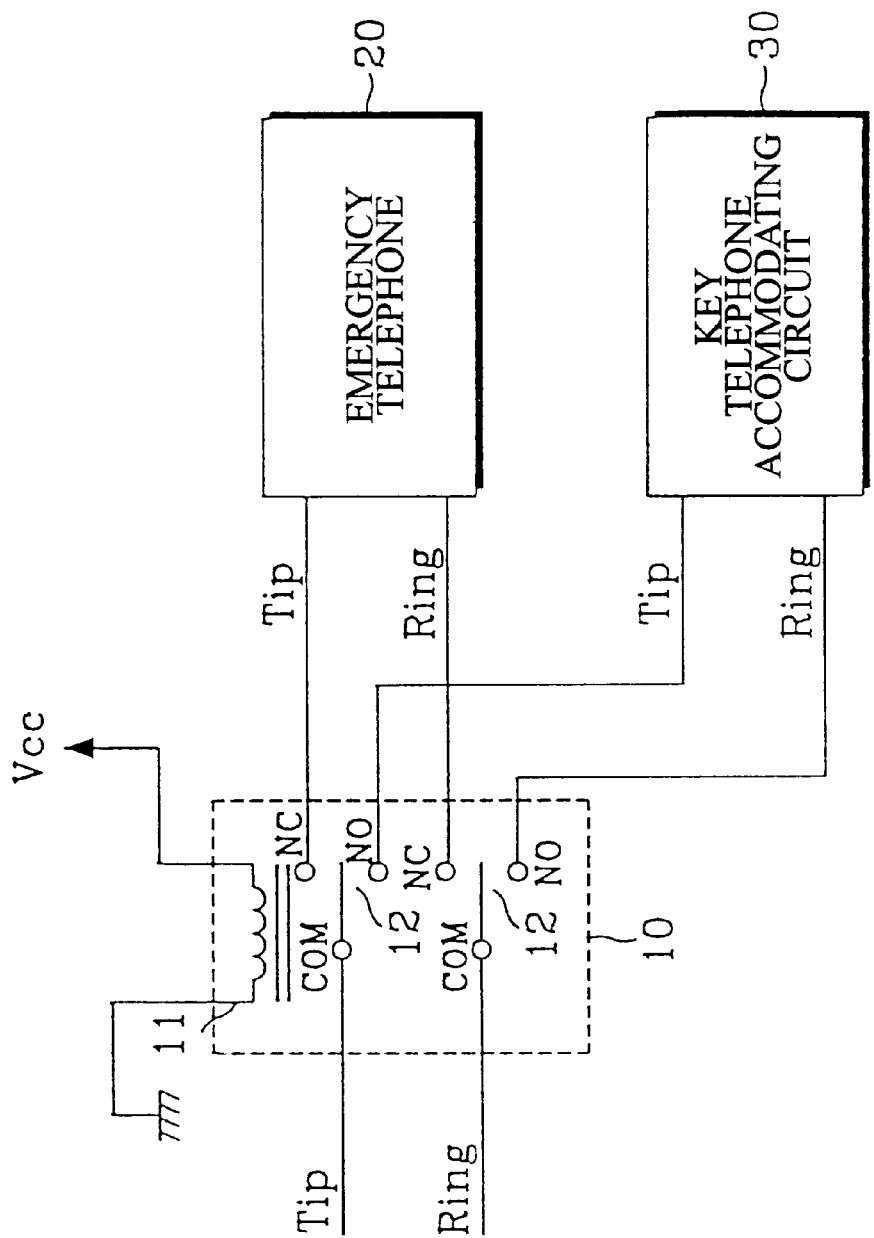
FIG. 1 shows an earlier power failure shunting office line restoring circuit in a key telephone system.

FIG. 1 is a circuit diagram of a power failure shunting office line circuit for an earlier key telephone system, in which a relay 10 has a pair of common ports COM respectively connected to a tip port TIP and a ring port RING of an office line. If the power supply is normal, a current flows through a coil 11 so that the pair of common ports COM connected to the tip port TIP and ring port RING of the office line are connected to a pair of normally open ports NO, which switches the office line to a key telephone office line accommodating circuit 30.

However, if the power supply has failed, the current does not flow through the coil 11. Thus, in the relay 10, the pair of common ports COM connected to the tip port TIP and ring port RING of the office line are connected to a pair of normally closed ports NC, which switches the office line to an emergency telephone 20.

Therefore, the earlier power failure shunting office line circuit determines an office line switching simply depending on the condition of the power supply hen the office line was again connected to the key telephone office line accommodating circuit. Thus, when the emergency telephone is connected to the office line during a power failure, the emergency telephone is automatically disconnected if power is abruptly restored, irrespective of the fact that a user may be in the middle of a conversation using the emergency telephone.

Figure 2:
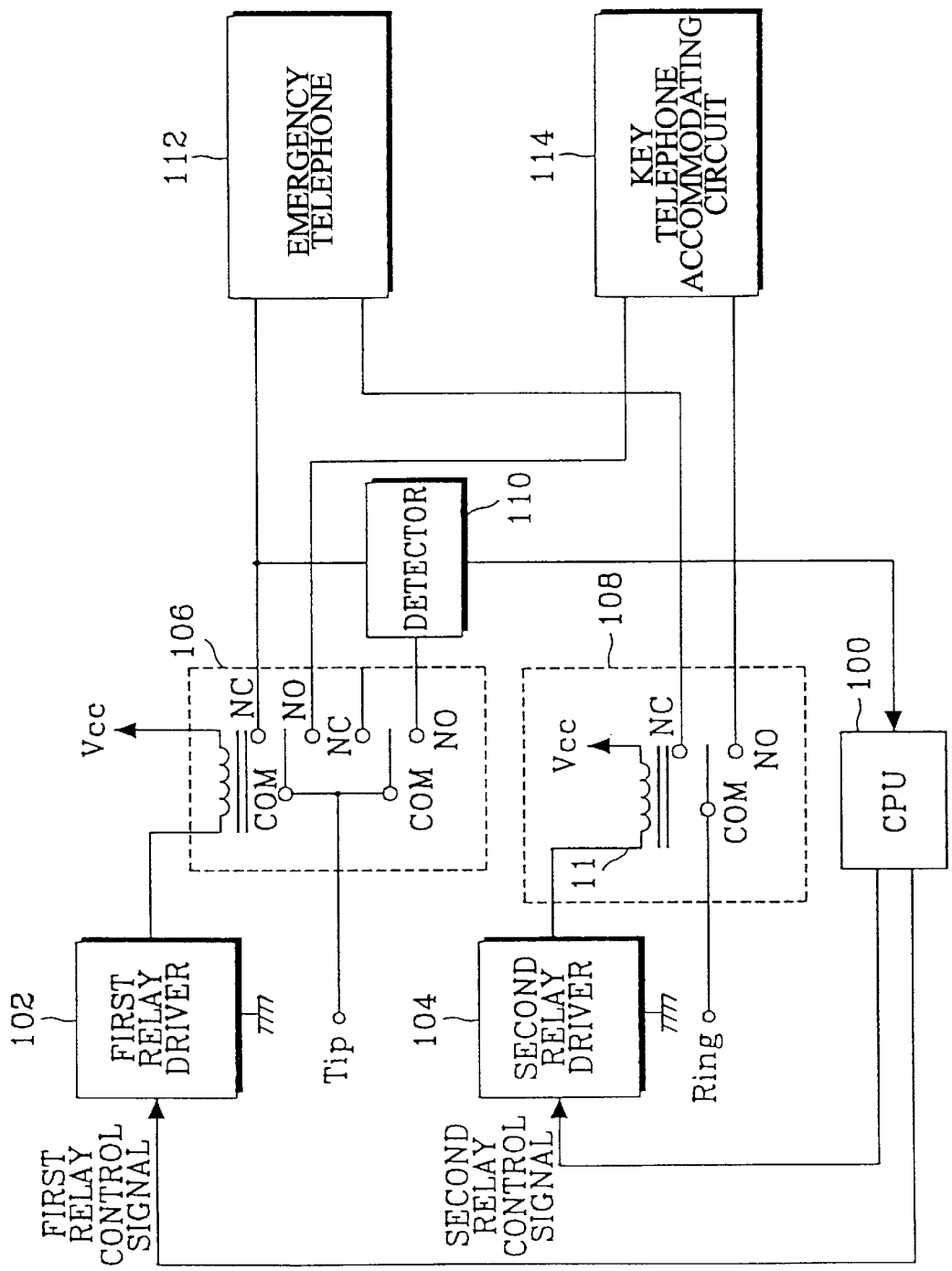
FIG. 2 shows a power failure shunting office line restoring circuit according to the present invention.

Referring to FIG. 2, the power failure shunting office line restoring circuit according to the present invention includes a emergency telephone 112, a key telephone office line accommodating circuit 114, a first relay 106 having an office line tip port TIP connected to a common port COM for connecting the tip port TIP of the office line to the emergency telephone 112 or key telephone office line accommodating circuit 114 in accordance with a first relay control signal; a second relay 108 having the office line ring port RING connected to a common port COM for connecting the ring port RING of the office line to the emergency telephone 112 or key telephone office line accommodating circuit 114 in accordance with a second relay control signal, a central processing unit (CPU) 100 for generating the first and second relay control signals according to a power supply or the emergency telephone use state detection signal, first and second relay drivers 102 and 104 for driving the first and second relays 106 and 108 by the first and second relay control signals generated by the CPU 100, and a detector 110 connected to the first relay 106 for detecting the use of the emergency telephone 112 and for outputting the use state detection signal to the CPU 100.

Figure 3:
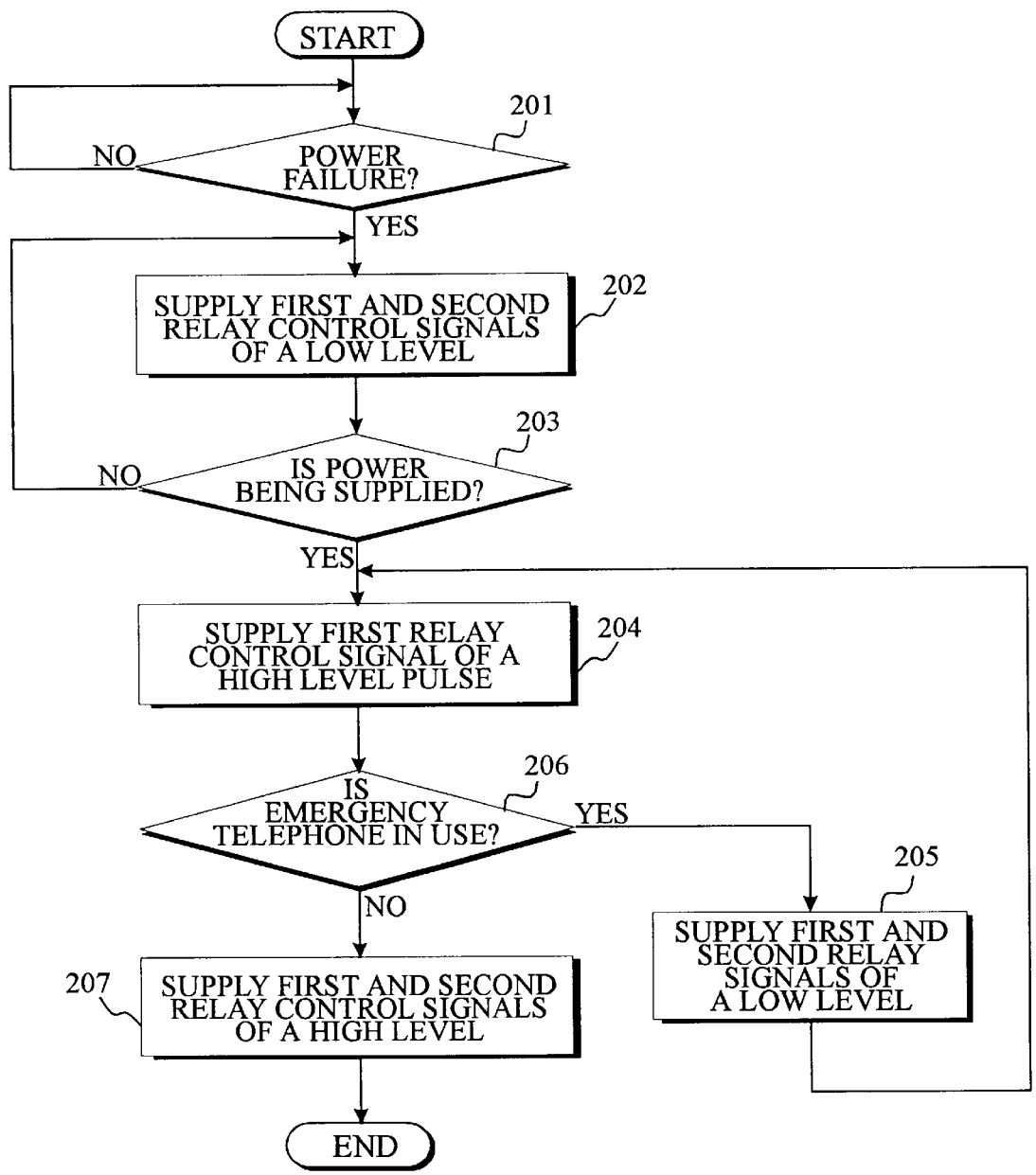
FIG. 3 is a flowchart of a power failure shunting office line restoring method during a power failure.

FIG. 3 is a flowchart of a power failure shunting office line restoring method during a power failure, which includes the steps of switching an office line to an emergency telephone when a power failure occurs, detecting the use of the emergency telephone when the power is restored to the key telephone system when the office line has been switched to the emergency telephone, maintaining the connection of the office line to the emergency telephone when the emergency telephone is in use, and switching the office line to a key telephone office line accommodating circuit when the emergency telephone is no longer in use.

Referring to FIGS. 1–4C, in a state where power is normally supplied to a key telephone system, the CPU 100 applies the first and second relay control signals of "high" state to the first and second relay drivers 102 and 104, as shown in FIG. 4B. Then, the first relay driver 102 drives the first relay 106 so that current flows therein, thereby switching the common port COM connected to the tip port TIP of the office line so as to be connected to a normally open port NO. Similarly, the second relay driver drives the second relay 108 so that the COM port thereof connected to the ring port RING of the office line is connected to the normally open port NO. Accordingly, the tip port TIP and ring port RING of the office line are connected to the key telephone office line accommodating circuit 114.

However, if a power failure occurs, that is, if power is not supplied to the system (step 201), the CPU 100 supplies first and second relay control signals of a "low" level to the first and second relay drivers 102 and 104, as shown in FIG. 4C (step 202). Then, since power is not being supplied to the system, the first relay driver 102 switches the common port COM connected to the tip port TIP of the office line so as to be connected to a normally closed port NC. The second relay driver 104 switches the common port COM connected to the ring port RING of the office line so as to be connected to the normally closed port NC. Accordingly, the tip port TIP and ring port RING of the office line are connected to the emergency telephone 112.

If the power is restored to the key telephone system again (step 203), the CPU 100 supplies the first relay control signal having a "high" level pulse to the first relay driver 102, as shown in FIG. 4A. Then, the first relay driver 102 drives the first relay 106 so that the current may flow therein during the period of a "high" pulse signal (A) as shown in FIG. 4A, thereby switching the common port COM connected to the tip port TIP of the office line so as to be connected to the normal open port NO. At this time, the detector 110 outputs a use state detection signal, with a communication loop formed between the tip port TIP and ring port RING of the office line connected to the emergency telephone 112. Here, the high pulse period (A) is set to be smaller than an on-hook detection time of a telephone office exchange. Then, the CPU 100 receives the use state detection signal from the detector 110 and determines whether or not the emergency telephone 112 is in use (step 206). At this time, if the CPU 100 determines that the emergency telephone 112 is in use, first and second relay control signals of a low level are supplied to the first and second relay drivers 102 and 104 (step 205). Then, the first and second relay drivers 102 and 104 prevent the current from flowing in the first and second relays 106 and 108, thereby switching the common port COM connected to the tip port TIP of the office line so as to be connected to the normally closed port NC. Also, the CPU 100 supplies a high pulse as shown in FIG. 4A to the first relay driver 102 in a predetermined cycle and determines whether or not the emergency telephone 112 is in use. When it is determined that the emergency telephone 112 is no longer in use, the CPU 100 supplies the first and second relay control signals of a high level to the first and second relay drivers 102 and 104 (step 207). Then, the first relay driver 102 drives the first relay 106 so that the current may flow therein, thereby switching the common port COM connected to the tip port TIP of the office line so as to be connected to the normally open port NO. The second relay driver 104 drives the second relay 108 so that the current may flow therein, thereby switching the common port COM connected to the ring port RING of the office line so as to be connected to the normally open port NO. Accordingly, the tip port TIP and ring port RING of the office line is connected to the key telephone office line accommodating circuit 114, which allows the key telephone system to be used.

As described above, according to the present invention, when a power failure occurs during the use of a key telephone system, an office line is switched so as to be connected to an emergency telephone, thereby allowing an office line shunt by using the emergency telephone. When the power is restored to the key telephone system again, a determination is made as to whether or not the emergency telephone is in use. If the emergency telephone is in use, the office line is not switched to a key telephone office line accommodating circuit. However, if the emergency telephone is not in use, the office line is switched to the key telephone office line accommodating circuit. Thus, the communication line of a shunting office line is prevented from being disconnected when the power is restored.

Therefore, it should be understood that the present invention is not limited to the particular embodiment disclosed herein as the best mode contemplated for carrying out the present invention, but rather that the present invention is not limited to the specific embodiments described in this specification except as defined in the appended claims. For example, while electromechanical relays have been disclosed, solid state relays could easily be substituted.

What is claimed is:

1. A power failure shunting office line restoring circuit comprising:
   a first relay having an office line tip port connected to a common port for connecting said tip port of said office line to one of a separate emergency telephone for use only in emergencies and a key telephone office line accommodating circuit in accordance with a first relay control signal;
   a second relay having an office line ring port connected to a common port for connecting said ring port of said office line to one of said emergency telephone and said key telephone office line accommodating circuit in accordance with a second relay control signal;
   a controller unit for generating said first and second relay control signals according to a power supply state or emergency telephone use state detection signal;
   first and second relay drivers unit for respectively driving said first and second relays in accordance with said first and second relay control signals generated by said controller; and
   a detector connected to said first relay for detecting the use of said emergency telephone and for outputting said use state detection signal to said controller.

2. A power failure shunting office line restoring circuit as claimed in claim 1, wherein said first control signal generated by said controller is a high signal having a predetermined pulse width if the power is restored again after a power failure.

3. A power failure shunting office line restoring circuit as claimed in claim 2, wherein the predetermined pulse width is set to be smaller than an on-hook detection time of a telephone office exchange.

4. A power failure shunting office line restoring method during a power failure in a key telephone system having a separate emergency telephone for use only in emergencies and a key telephone office line accommodating circuit, said method comprising the steps of:
   switching an office line to the emergency telephone from the key telephone office line accommodating circuit when a power failure occurs;
   detecting the use of said emergency telephone when the power is restored to said key telephone system when said office line has been switched to said emergency telephone; and
   maintaining the connection of said office line to said emergency telephone when said emergency telephone is in use.

5. A power failure shunting office line restoring method during a power failure as claimed in claim 4, further comprising the step of:
   switching said office line to the key telephone office line accommodating circuit when said emergency telephone is no longer in use.

6. A power failure shunting office line restoring circuit comprising:
   a first switching means having an office line tip port connected to a common port for connecting said tip port of said office line to one of a separate emergency telephone line for use only in emergencies and a key telephone office line accommodating circuit in accordance with a first switching means control signal;
   a second switching means having an office line ring port connected to a common port for connecting said ring port of said office line to one of said emergency telephone line and said key telephone office line accommodating circuit in accordance with a second switching means control signal;
   a controller unit for generating said first and second switching means control signals according to a power supply state or emergency telephone use state detection signal;
   first and second switch drivers unit for respectively driving said first and second switching means in accordance with said first and second switching control signals generated by said controller; and
   a detector connected to said first switching means for detecting the use of said emergency telephone and for outputting said use state detection signal to said controller.

7. A power failure shunting office line restoring circuit as claimed in claim 6, wherein said first control signal generated by said controller is a high signal having a predetermined pulse width if the power is restored again after a power failure.

8. A power failure shunting office line restoring circuit as claimed in claim 7, wherein the predetermined pulse width is set to be smaller than an on-hook detection time of a telephone office exchange.

9. A power failure shunting office line restoring circuit as claimed in claim 6, wherein said first and second switching means each comprise solid state relays.

* * * * *